United States Patent [19]
Szabo et al.

[11] Patent Number: 5,742,226
[45] Date of Patent: Apr. 21, 1998

[54] SIMPLE THEFT DETERRENT FOR ELECTRONIC CONTROL MODULES

[75] Inventors: Ronald Julius Szabo, Noblesville; Dan Darryl Carman, Russiaville, both of Ind.

[73] Assignee: Delco Electronics Corporaiton, Kokomo, Ind.

[21] Appl. No.: 270,357

[22] Filed: Jul. 5, 1994

[51] Int. Cl.$^6$ ..................................... B60Q 1/00
[52] U.S. Cl. ................. 340/425.5; 307/10.2; 455/186.1
[58] Field of Search .................. 340/425.5, 426, 340/568, 571, 825.3, 825.71, 543; 455/186.1, 186.2, 346, 348; 307/10.2, 10.4

[56] References Cited

U.S. PATENT DOCUMENTS

| | | | |
|---|---|---|---|
| 4,106,006 | 8/1978 | Atkins | 340/543 |
| 4,638,293 | 1/1987 | Min | 340/426 |
| 4,683,426 | 7/1987 | Takeda et al. | 340/571 |
| 4,683,462 | 7/1987 | Takeda et al. | 340/568 |
| 4,720,700 | 1/1988 | Seibold et al. | 340/568 |
| 4,743,894 | 5/1988 | Bochmann | 340/568 |
| 4,808,981 | 2/1989 | Seibold | 340/568 |
| 5,054,119 | 10/1991 | Rolland | 455/346 |
| 5,091,724 | 2/1992 | Go | 340/825.56 |
| 5,107,244 | 4/1992 | Minamide et al. | 340/426 |
| 5,245,330 | 9/1993 | Wassink | 340/825.34 |
| 5,323,139 | 6/1994 | Isaki et al. | 340/426 |
| 5,349,326 | 9/1994 | Yamada | 340/426 |

*Primary Examiner*—Jeffery Hofsass
*Assistant Examiner*—Timothy Edwards, Jr.
*Attorney, Agent, or Firm*—Jimmy L. Funke

[57] ABSTRACT

An electronic theft deterrent system for deterring theft of an electronic device, such as a radio associated with a vehicle, that takes advantage of already existing device parameters, controls and displays associated with the device. When used as a theft deterrent system for the vehicle radio, a radio operator will first activate a frequency control switch in order to set an arbitrary frequency in the display of the radio. Next, a predetermined set of theft key radio control buttons are activated for a predetermined time in order to cause the arbitrary frequency that is displayed to be stored in a non-volatile memory. When the frequency is stored, the radio volume is impaired, but the total operation of the radio is not disabled. When the operator wishes to restore the radio to its normal operating condition, the operator will reset the arbitrary frequency, and reactivate the theft key control buttons. If the currently displayed frequency setting matches the stored frequency setting in the memory, the radio will be removed from the theft guarded condition, and the audio portion of the radio will be restored. If successive attempts to restore the radio to its normal operating conditions fail, an attempts counter will cause the radio to remain in its impaired state until an authorized service agent is able to restore the operation of the radio.

26 Claims, 2 Drawing Sheets

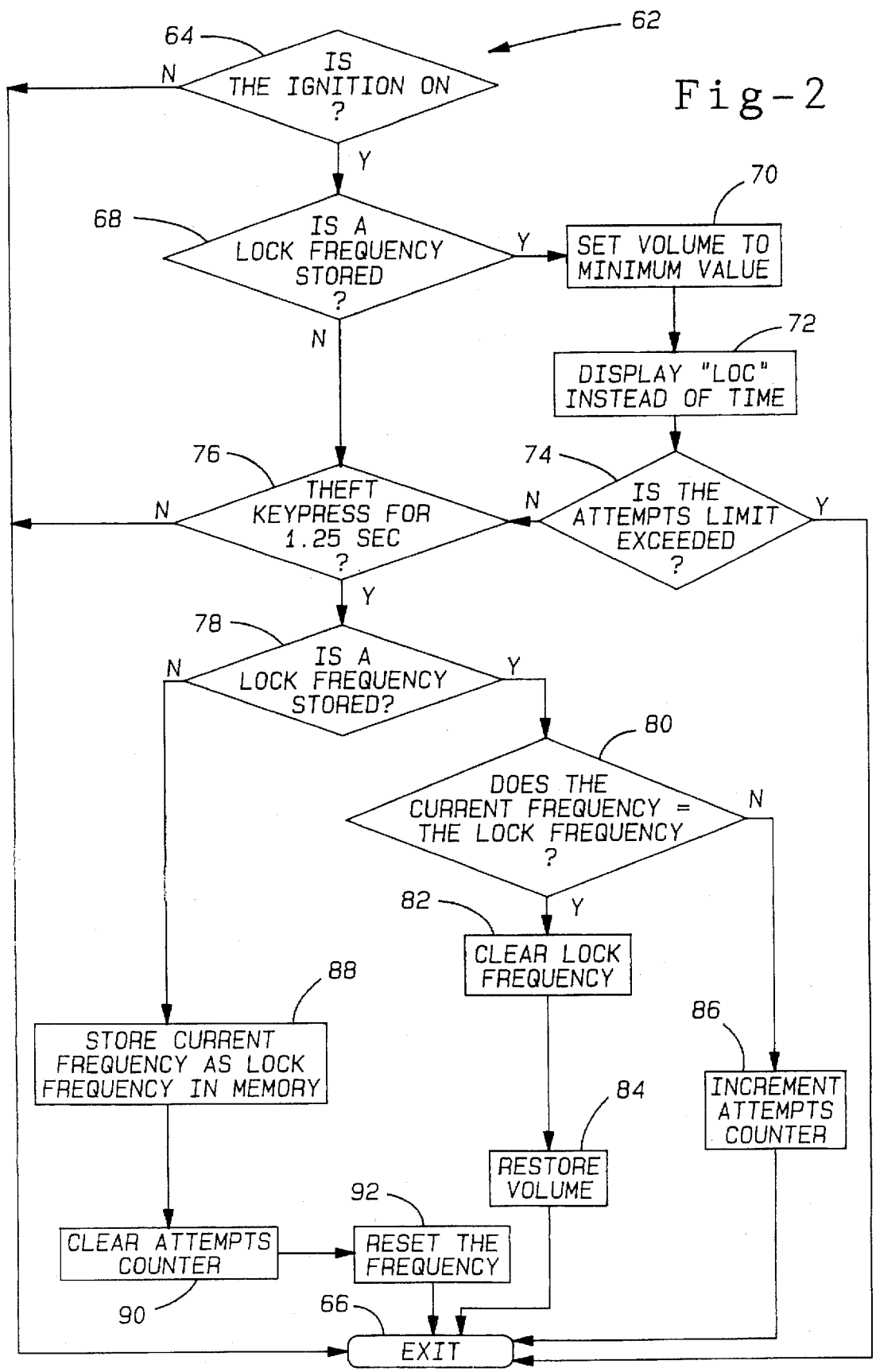

SIMPLE THEFT DETERRENT FOR ELECTRONIC CONTROL MODULES

BACKGROUND OF THE INVENTION

1. Field of the Invention

This invention relates generally to a theft deterrent system for an electronic device and, more particularly, to a theft deterrent system for an electronic device that degrades the performance of the device in the event of theft, and that uses hardware and software already associated with the device.

2. Discussion of the Related Art

Theft of portable electronic devices, such as cellular telephones, automobile radios, navigation systems and the like, is a significant problem. Electronic audio devices are particularly desirable to thieves because they are easily concealed, easily transported, and generally have relatively high value in illegal resale markets. Moreover, because high function, personal electronic devices are becoming more sophisticated and popular at a significantly increasing rate, theft of these types of devices is increasing at an alarming rate.

Many electronic devices incorporate theft deterrent systems in order to combat theft of these devices. For car radios, first generation theft deterrent systems were generally mechanical devices that attempted to make the radio physically difficult to remove from the dashboard of the vehicle. These mechanical theft deterrent systems used such things as mechanical locks and keys, and mountable cases having removable electronics and/or front panels. Although these types of systems have met with some success, they are generally both expensive and cumbersome to use.

As electronic devices became more sophisticated, electronic theft deterrent systems were developed. These types of theft deterrent systems would generally render the electronic device useless after a theft event. The device would remain useless until it was re-enabled by an authorized user. Such electronic deterrent systems have cost advantages over their original mechanical counterparts, are easier to manufacture and service, and may have certain marketing advantages as a result of being a "high-tech" solution.

Initial attempts at electronic theft deterrent systems implemented a fixed alphanumeric code which was set at the time the device was produced. The theft deterrent system was always enabled in that the user entered a fixed code to unlock the system each time the device was to be used. Although this type of fixed code system was relatively inexpensive, special production considerations forced the user to make use of a code which could be difficult to remember. An enhancement to this type of system provided the user with the capability of selecting a personal multi-character alphanumerical code number which could be changed. This enhanced system improved usability since the user could now choose a familiar code number. However, the software to allow the user to do this required significant computer resources to provide code selection and display capability. Such a consideration is important for resource limited devices. Code setting also complicated the deterrent system, thus forcing the user to learn additional operations to use the system.

Current electronic theft deterrent systems have been underutilized as a result of the complexity of the user interface. Turning the theft deterrent system on, and setting the theft deterrent code consists of a number of steps which are not always obvious and may be somewhat complicated. Furthermore, in code based systems, as mentioned above, the user is forced to remember a certain code which is most likely unrelated to the protected device. Moreover, current electronic theft deterrent implementations generally function independently from other system functions, thus losing advantages of sharing software and hardware with other system features. For example, many electronic devices do not have software to support entering and displaying a numeric security code. Hardware and software dedicated to theft deterrent display and input is costly, and does little to enhance the intended device functionality. Furthermore, the algorithms to implement these systems have tended to be fairly complicated, thus consuming significant memory. The more complicated the algorithm, the more costly the theft deterrent system.

What is needed is a simple electronic theft deterrent system which is capable of utilizing already existing software and hardware in an electronic device. It is therefore an object of the present invention to provide such a theft deterrent system.

SUMMARY OF THE INVENTION

In accordance with the teaching of the present invention, an electronic theft deterrent system is disclosed for deterring theft of an electronic device where the system takes advantage of already existing device parameters, controls and displays to implement the theft system. A device user will first activate a predetermined device control to a predetermined state, and then will activate a theft key to store the state in a memory so as to activate the theft system. The state is a state that exists in the normal operation of the device and the theft key is a pre-existing control of the device. The theft key can be a combination of pre-existing controls for enhanced security. When the theft system is activated, the performance of the device will be impaired, but will not necessarily be totally disabled.

When the user wishes to restore the device to its normal, unimpaired operation, the user will set the device control to the predetermined state as a current state, and again reactivate the theft key. The system will compare the current state with the stored state to determine if an authorized attempt is being made to return the device to normal operation. If the states match, the system will restore the device to its normal operation. However, if the states do not match, the attempt is unsuccessful, and the device will remain impaired. Further, an attempts counter will be incremented. If successive attempts do not match the original state, the system will completely lock out the system against any further attempts, and only an authorized dealer of the device can restore the device to its normal operation.

Additional objects, advantages, and features of the present invention will become apparent from the following description and appended claims, taken in conjunction with the accompanying drawings.

BRIEF DESCRIPTION OF THE DRAWINGS

FIG. 2 is a flow chart depicting the operation of the theft deterrent system depicted in FIG. 1.

DETAILED DESCRIPTION OF THE PREFERRED EMBODIMENTS

Figure 1:
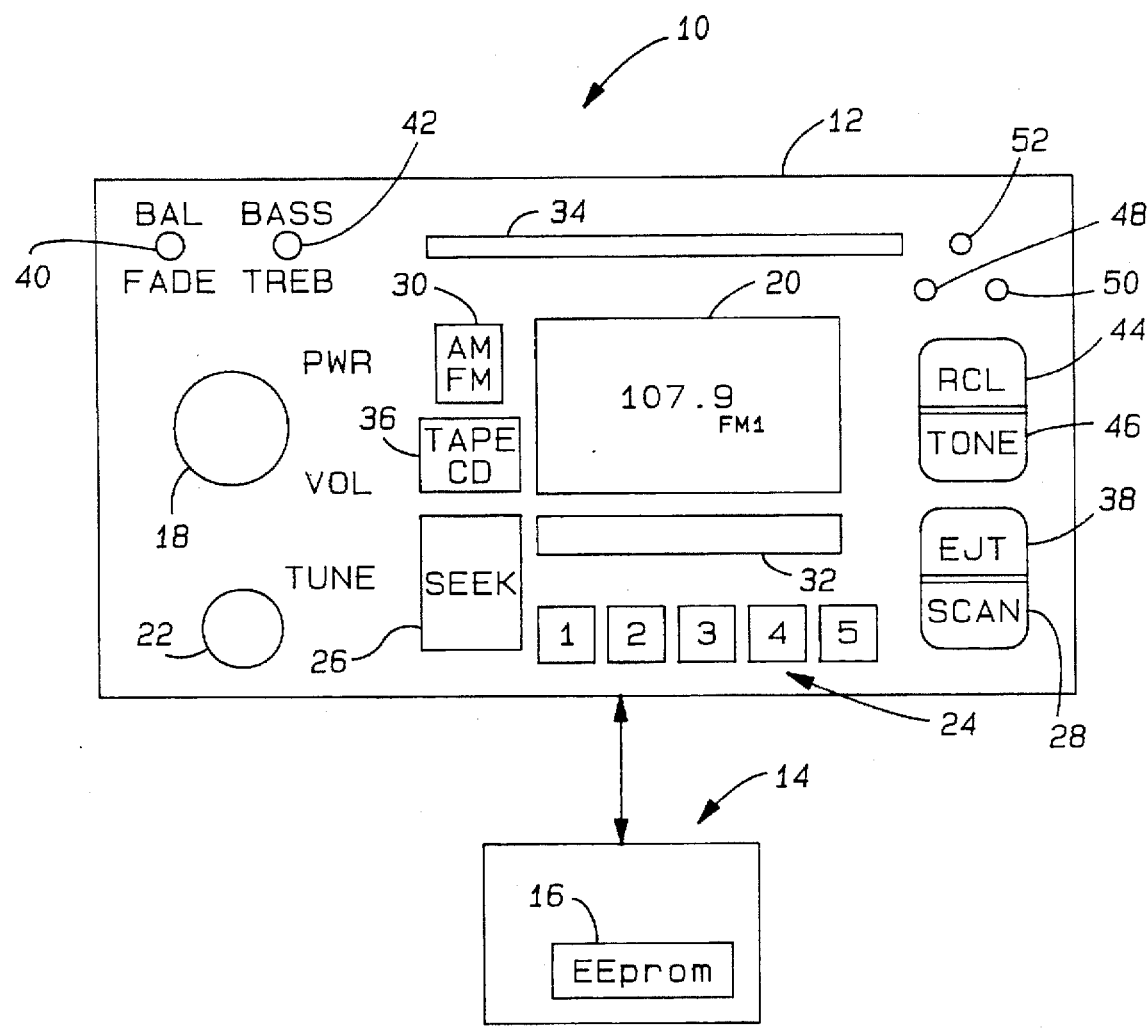
FIG. 1 is a block diagram of a theft deterrent system associated with a vehicle radio according to a preferred embodiment of the present invention.

The following discussion of the preferred embodiments concerning an electronic theft deterrent system is merely exemplary in nature and is in no way intended to limit the invention or its application or uses. Particularly, the description below will specifically address a theft deterrent system for deterring theft of a radio associated with a vehicle. However, the theft deterrent system of the invention is applicable to many other electronic devices including, but not limited to, portable radios, cellular phones, etc.

With the above caveat in mind, first turn to FIG. 1. FIG. 1 shows a block diagram representation of the controls of a dual playback radio 10 as could be found in a vehicle. The radio 10 includes a front control panel 12 and a microcomputer 14 interconnected to the control panel 12. The microcomputer 14 includes an erasable programmable read only memory (EEPROM) 16. In one example, the microcomputer 14 is a member of the TMS 370 family of microprocessors available from Texas Instruments. The control panel 12 includes a number of control buttons, knobs and displays most of whose functions would be familiar to any person owning and/or operating a radio associated with a vehicle. Particularly, the control panel 12 includes a power and volume knob 18 for activating the radio 10 and setting a desirable volume for a set of speakers (not shown). A vacuum florescent display or liquid crystal display 20 will display a tuned radio frequency (such as 107.9 FM shown in FIG. 1), cassette tape functions, compact disc (CD) functions, time and/or other vehicle radio functions well understood in the art. A tuning knob 22 will tune the radio 10 to a frequency along the AM or FM frequency bands. A set of five preselect buttons 24 will automatically tune the radio 10 to a preselected radio frequency. Additionally, a seek button 26 and a scan button 28 are used to seek out and scan for radio frequency signals in a manner that is well understood in the art. An AM/FM select button 30 selects either the AM or FM radio frequency bands.

Below the display 20 is an opening 32 for inserting and withdrawing a cassette tape (not shown). Above the display 20 is an opening 34 for inserting and withdrawing a compact disc (not shown). A tape/CD select button 36 is activated to either select cassette operation or compact disc operation. An eject button 38 enables the cassette tape or compact disc to be ejected from the opening 32 or the opening 34, respectively.

Other radio function controls include a balance/fade button 40 that provides speaker volume balance. A base/treble button 42 controls the base and treble frequencies of the speaker output. A recall button 44 causes the radio frequency to be displayed within the display 20. In normal operation, the time would be displayed in the display 20 when a radio station was tuned, or the radio 10 was off. A tone button 46 provides different equalization settings for the different sound sources, i.e., radio station, cassette tape or compact disc. An hour button 48 and a minute button 50 provide a mechanism for setting the time as displayed in the display 20. A light emitting diode 52 blinks when a theft state is activated, as will be discussed below.

All of the control buttons and knobs discussed above, as well as the display 20, are typical of many different types of radio controls associated with vehicles. Thus, the operation of these controls is well understood in the art. Further, many modern radios include microprocessors for operating these controls by associated software.

The above described radio control knobs and buttons are also used to activate an electronic theft deterrent system according to a preferred embodiment of the present invention. A computer algorithm is used in connection with known control algorithms that control the radio 10 by the microprocessor 14 in order to enable the known radio controls to activate the theft deterrent system as will be described below.

In order to activate the theft deterrent system at a time when a vehicle operator does not want to operate the radio 10, but wants the radio 10 to be theft guarded, the operator will first set the radio 10 to any arbitrary frequency using the already existent radio tuning controls such as the tuning knob 22, the preselect buttons 24, the seek button 26, or the scan button 28. The display 20 will show the selected frequency. This selected frequency need not be an actual tuned radio station, but can be any frequency selected by the vehicle operator within the frequency range of the radio 10, including both the AM and FM frequency bands. Once the vehicle operator has selected the predetermined frequency setting, the vehicle operator will press and hold, for example, the first and fourth buttons of the preselect buttons 24 simultaneously for a predetermined period of time. In one example, this period of time would be about 1.25 seconds. This period of time is set so that if the preselect buttons 24 are inadvertently touched, the possibility of accidentally activating the theft system is substantially eliminated. Two preselect buttons 24 are used in order to increase the security of the system against unauthorized attempts to infiltrate the security system. Of course, single preselect buttons 24 or other combinations of other preselect buttons 24, as well as other hold times, would also be applicable. Also, other combinations of buttons, such as the tape/CD select button 34 and the recall/tone button 40, can be used to activate the system in accordance with other theft deterring schemes as provided by the particular algorithm being used.

When the first and fourth preselect buttons 24 have been held for 1.25 seconds, the microcomputer 14 will store the current frequency setting as displayed in the display 20 in the non-volatile memory 16, and enter a lock condition. When the radio 10 is in the lock condition and the ignition switch of the vehicle is on, the display 20 will show a lock condition by displaying the term LOC. In the lock condition, the audio portion of the radio 10 will be muted or set to a minimum value. Further, the current radio frequency setting will change to a random frequency. It is desirable to impair the radio 10, not totally disable the radio 10, when it is in the lock condition so as to conserve limited computer resources. Of course, other radio functions can be disabled when the radio 10 is in the lock condition in order to deter theft of the radio 10. When the radio 10 is in the lock condition and the ignition switch of the vehicle is off, the LED 52 will periodically flash to tell would-be thieves that a theft guard is activated. It is stressed that a frequency setting is one possible preferred state out of many that can be stored in the memory 16 for a lock condition. Other states, such as setting a time by the buttons 48 and 50 to be stored, represents another way of implementing the theft deterrent system of the invention. For protecting a cellular telephone, a sequence of arbitrary numbers could be stored.

When the vehicle operator wishes to remove the radio 10 from the lock condition in order to use the radio 10, the operator will first set the radio frequency to the same frequency that was used to put the radio 10 in the lock condition. When unlocking the radio 10, only the tuning knob 22 can be used to set the frequency because the other tuning controls, specifically, the preselect buttons 24, the seek button 26 and the scan button 28, are disabled so as to reduce the possibility of a thief selecting the correct frequency. Once the frequency is set, the vehicle operator will again press and hold the first and fourth preselect buttons 24 for the same period of time. i.e., 1.25 seconds. At this time, the microcomputer 14 will compare the current frequency setting as displayed in the display 20 to the frequency setting that was stored in the memory 16 at the time the lock condition was activated. If the frequencies match, the microcomputer 14 will return the audio of the radio 10 to a normal condition, and enter an unlocked state so as to return the radio 10 to its normal operation. If the frequencies do not match, the microcomputer 14 will increment an attempts counter within the software associated with the microcomputer 14 and remain in the locked state. If a sequence of wrong attempts causes the attempt counter to exceed a predetermined number of attempts, such as nine attempts, the microcomputer 14 will not allow any further unlocking attempts, and the radio 10 must be taken to an authorized service center to be reactivated. If the radio 10 is in this condition, the display 20 will show the term LO2 instead of LOC. Each time the theft system is deactivated, the microcomputer 14 will reset the attempt counter to zero.

FIG. 2 shows a flowchart diagram 62 of an algorithm which depicts the steps of activating and deactivating the theft guard system, according to a preferred embodiment of the present invention. The algorithm is specifically set forth in assembly language in Appendix A. A first step of the diagram 62 involves determining whether the ignition of the vehicle is on as represented by decision diamond 64. If the ignition is not on, the algorithm immediately exits the program as shown by exit block 66. If the ignition is on, the algorithm then determines if a lock frequency has been stored in the memory 16 as represented by decision diamond 68. If the algorithm determines that there is a lock frequency stored, and thus the radio 10 should be theft protected, the microprocessor 14 will set the volume to a minimum value as indicated by block 70. Additionally, the microprocessor 14 will display the letters LOC in the display 20 instead of the time as indicated by block 72.

After the microprocessor 14 has displayed the letters LOC, the microprocessor 14 will then determine if the attempts limit has been exceeded as represented by decision diamond 74. As discussed above, the algorithm will count the number of attempts that have occurred and failed to remove the radio 10 from the locked condition, and if a predetermined number of attempts is exceeded, the algorithm will assume that an unauthorized operator is attempting to reactivate the radio 10. If the answer to the question of whether the attempts limit has been exceeded is yes, the algorithm will exit the program as represented by the arrow to the exit block 66, and any further attempts to reactivate the radio 10 will fail. When this happens, even the user cannot remove the radio out of the lock condition, and therefore must take the radio 10 to an authorized dealer to have it reset.

If the answer to the decision diamonds 68 or 74 is no, the algorithm will then determine if the theft key buttons have been pressed for a predetermined period of time, here 1.25 seconds. As discussed above, the theft key buttons are a combination of the first and fourth preselect buttons 24, but can be any other desirable set combination of buttons. If the algorithm determines that the theft key buttons are not being pressed for the predetermined time, the algorithm will then exit to the exit block 66. If, however, the algorithm determines that the theft key buttons are being pressed, then the algorithm will determine if a locked frequency is stored as represented by decision diamond 78. If the algorithm determines that a lock frequency is stored, and thus the radio is theft protected, the algorithm will then determine if the current frequency as displayed in the display 20 is equal to the locked frequency as stored in the memory 16 as represented by decision diamond 80.

If the algorithm determines that the current set frequency and the stored lock frequency are equal, the algorithm will clear the memory 16 of the lock frequency as represented by block 82, and the volume of the radio will be restored to normal as represented by block 84. Therefore, the radio 10 will be unlocked and left unprotected. The algorithm will then exit as represented by the block 66. If, however, the algorithm determines that the current frequency does not equal the locked frequency, the algorithm will increment the attempts counter as represented by block 86, and the algorithm will exit without unlocking the radio 10.

If the algorithm determines that a lock frequency is not stored, the algorithm will store the current frequency as set in the display 20 in the memory 16 as the lock frequency as represented by block 88, thus initiating the theft guard condition. Additionally, the algorithm will clear the attempts counter as indicated by block 90. Once the attempts counter has been cleared, the system will reset the frequency in the display 20 to a random value as represented by block 92, and the system will exit to the exit block 66. In a preferred embodiment, the algorithm will perform the above described steps associated with the diagram 62 every 30 ms.

The foregoing discussion discloses and describes merely exemplary embodiments of the present invention. One skilled in the art will readily recognize from such discussion, and from the accompanying drawings and claims, that various changes, modifications, and variations can be made therein without departing from the spirit and scope of the invention as defined in the following claims.

We claim:

1. A method of activating and deactivating a theft guard system that deters theft of an electronic device, said method comprising the steps of:

setting a predetermined theft guard state, said theft guard state being set by a first control of the device, said first control being used in the normal operation of the device that is unrelated to the theft guard system during the normal operation of the device such that the theft guard state is a normal state of the device during the normal operation of the device; and activating a theft guard condition, said step of activating a theft guard condition including activating a second control of the device, said second control being used in the normal operation of the device and being unrelated to the theft guard system during the normal operation of the device, said step of activating a theft guard condition further including storing the theft guard state in a memory to provide a stored theft guard state, said step of activating the theft guard condition further including at least partially disabling the electronic device.

2. The method according to claim 1 further comprising the steps of resetting the predetermined theft guard state to provide a current theft guard state and reactivating the second control of the device, said step of reactivating the second control causing the electronic device to compare the stored theft guard state with the current theft guard state, and causing the electronic device to be removed from the theft guard condition if the stored and current theft guard states match.

3. The method according to claim 2 further comprising the step of incrementing an attempts counter each time the step of reactivating the second control of the device occurs and the stored theft guard state does not match the current theft guard state.

4. The method according to claim 3 further comprising the step of preventing the electronic device from being removed from the theft guard condition when the attempts counter reaches a predetermined value even if the stored theft guard state matches the current theft guard state when the second control of the device is reactivated.

5. The method according to claim 3 wherein the step of removing the electronic device from the theft guard condition includes setting the attempts counter to zero.

6. The method according to claim 1 wherein the step of activating a theft guard condition includes displaying a theft guard condition signal on the device.

7. A method of activating and deactivating a theft guard system that deters theft of a radio associated with a vehicle, said method comprising the steps of:

activating a radio frequency control switch so as to display an arbitrary frequency on a display device associated with the radio;

activating a theft guard switch associated with the radio so as to store the arbitrary frequency in a memory and provide a stored frequency in order to put the radio in a theft guard condition where the radio is at least partially impaired, said theft guard switch being a switch used in the normal operation of the radio;

reactivating the radio frequency control switch so as to redisplay the arbitrary frequency on the display device in order to provide a current frequency;

reactivating the theft guard switch so as to compare the stored frequency with the current frequency; and removing the radio from the theft guard condition if the stored frequency matches the current frequency.

8. The method according to claim 7 further comprising the step of incrementing an attempts counter each time the step of reactivating the theft guard switch occurs and the current frequency does not match the stored frequency.

9. The method according to claim 8 further comprising the step of preventing the radio from being removed from the theft guard condition when the attempts counter reaches a predetermined value even if the stored frequency matches the current frequency during the step of reactivating the theft guard switch.

10. The method according to claim 9 further comprising the step of displaying an indication that the attempts counter has reached the predetermined value on the display device.

11. The method according to claim 8 wherein the step of removing the radio from the theft guard condition includes setting the attempts counter to zero.

12. The method according to claim 7 wherein the step of putting the radio in a theft guard condition includes displaying a theft guard condition signal on the display device.

13. The method according to claim 12 wherein the step of displaying a theft guard condition signal includes the step of activating an LED when the radio is in the theft guard condition, said step of activating an LED including causing the LED to blink at a periodic rate.

14. The method according to claim 7 wherein the step of putting the radio in a theft guard condition includes forcing the volume of the radio to remain at substantially a minimum volume.

15. The method according to claim 7 wherein the step of activating the theft guard switch includes activating the theft guard switch for a period of time greater than 1 second.

16. The method according to claim 7 wherein the step of storing the arbitrary frequency includes storing the arbitrary frequency in a non-volatile memory associated with a microcomputer.

17. The method according to claim 7 wherein the theft guard switch is a combination of frequency preselect switches.

18. A theft guard system for deterring the theft of an electronic device, said theft guard system comprising:

first control means for setting a predetermined theft guard state, said first control means being used in the normal operation of the device that is unrelated to the theft guard system during the normal operation of the device such that the theft guard state is a normal state of the device during the normal operation of the device; and second control means for activating a theft guard condition, said second control means being used in the normal operation of the device and being unrelated to the theft guard system during the normal operation of the device, wherein activating the second control means causes the theft guard state to be stored in a memory as a stored theft guard state and wherein the theft guard condition causes the electronic device to be at least partially disabled.

19. The system according to claim 18 wherein the first control means is reactivated to provide a current theft guard state and the second control means is reactivated to compare the current theft guard state with the stored theft guard state, wherein if the stored theft guard state and the current theft guard state are the same, the device will be removed from the theft guard condition.

20. The system according to claim 19 further comprising an attempts counter, said attempts counter being incremented if the current theft guard state does not match the stored theft guard state when the second control means is reactivated.

21. The system according to claim 20 wherein the attempts counter prevents the device from being removed from the theft guard condition if the attempts counter is incremented to a predetermined value.

22. The system according to claim 18 further comprising a theft guard condition display device, said theft guard condition display device displaying an indication of the theft guard condition.

23. The system according to claim 18 wherein the electronic device is a vehicle radio and the first and second control means are control switches used in the normal operation of the vehicle radio.

24. The system according to claim 23 wherein the first control means is a radio frequency control switch and wherein the theft guard state is a frequency setting set by the frequency control switch.

25. The system according to claim 24 wherein the frequency control switch is reactivated after the theft guard condition is set to provide a current frequency setting and the second control means is reactivated to compare the current frequency setting with the stored frequency setting, wherein if the stored frequency setting and the current frequency setting are the same, the vehicle radio will be removed from the theft guard condition.

26. A method of activating and deactivating a theft guard system that deters theft of a radio associated with a vehicle, said method comprising the steps of:

activating a radio frequency control switch so as to display an arbitrary frequency on a display device associated with the radio;

activating a combination of frequency preselect switches associated with the radio so as to store the arbitrary frequency in a memory and provide a stored frequency in order to put the radio in a theft guard condition where the radio is at least partially impaired, said frequency preselect switches being switches used to set preselected frequencies in the normal operation of the radio;

reactivating the radio frequency control switch so as to redisplay the arbitrary frequency on the display device in order to provide a current frequency;

reactivating the combination of frequency preselect switches so as to compare the stored frequency with the current frequency;

removing the radio from the theft guard condition if the stored frequency matches the current frequency; and incrementing an attempts counter each time the step of reactivating the combination of frequency preselect switches occurs and the current frequency does not match the stored frequency.

* * * * *